US005858104A

United States Patent [19]
Clark

[11] Patent Number: 5,858,104
[45] Date of Patent: Jan. 12, 1999

[54] SYSTEM FOR FOCUSED GENERATION OF PRESSURE BY BUBBLE FORMATION AND COLLAPSE

[75] Inventor: Joseph A. Clark, Arlington, Va.

[73] Assignee: The United States of America as represented by the Secretary of the Navy, Washington, D.C.

[21] Appl. No.: 591,188

[22] Filed: Dec. 21, 1995

Related U.S. Application Data

[63] Continuation-in-part of Ser. No. 523,092, Sep. 1, 1995, abandoned, which is a continuation of Ser. No. 129,498, Sep. 30, 1993, abandoned.

[51] Int. Cl.[6] .......... B08B 3/12
[52] U.S. Cl. .......... 134/1; 134/42; 134/184
[58] Field of Search .......... 134/1, 42, 184; 376/100, 102, 103, 149, 146

[56] References Cited

U.S. PATENT DOCUMENTS

| | | | |
|---|---|---|---|
| 3,037,922 | 6/1962 | Johnson | 376/189 |
| 3,346,458 | 10/1967 | Schmidt | 376/149 |
| 3,378,446 | 4/1968 | Whittlesey | 376/10 |
| 3,624,239 | 11/1971 | Fraos | 376/103 |
| 3,762,992 | 10/1973 | Hedstrom | 376/103 |
| 4,333,796 | 6/1982 | Flynn | 376/100 |
| 4,344,911 | 8/1982 | Maniscalco | 376/102 |
| 4,367,130 | 1/1983 | Lemelson | 204/157.42 |
| 4,691,724 | 9/1987 | Garcia et al. | 134/1 X |
| 4,874,596 | 10/1989 | Lemelson | 423/446 |
| 5,523,058 | 6/1996 | Umemura et al. | 134/1 X |

FOREIGN PATENT DOCUMENTS

| | | |
|---|---|---|
| 774052 | 5/1957 | United Kingdom . |
| 825026 | 12/1959 | United Kingdom . |

OTHER PUBLICATIONS

Dingee Fusim Power—C & DN Apr. 2, 1979—vol. 1 No. 2 pp. 32–47.
Browne New Shot at Cold Fusim—The New York Times Dec. 20, 1994—pp. C1 & C10.

*Primary Examiner*—Jill Warden
*Assistant Examiner*—Saeed T. Chaudhry
*Attorney, Agent, or Firm*—John Forrest; Jacob Shuster

[57] ABSTRACT

A pressure generating system uses a shock wave chamber filled with a liquid pressurized to a static pressure different from ambient atmospheric pressure. Once a a preferred location is established in the chamber, a pulsed compressional acoustic shock wave introduced into the liquid is reflected from a free surface of the liquid as a dilatation wave focused on a point at which a bubble forms and expands about an object. The static pressure causes the bubble to collapse around the object to generate a high pressure thereat.

20 Claims, 2 Drawing Sheets

30
PRESSURE SOURCE
10
15
50
36
38
AMP
32
14
34
100
12
42
44
PULSED POWER SOURCE

SYSTEM FOR FOCUSED GENERATION OF PRESSURE BY BUBBLE FORMATION AND COLLAPSE

The present invention relates generally to the development of pressure within a small volume by formation and collapse of bubbles in a liquid medium, and is a continuation in-part of prior application Ser. No. 08/523,092, filed Sep. 1, 1995, now abandoned which is a continuation of U.S. Ser. No. 08/129,498, filed Sep. 30, 1993, now abandoned.

BACKGROUND OF THE INVENTION

It is generally known in the art as explained in U.S. Pat. No. 4,333,796 to Flynn, that bubbles of gas and vapor in a liquid medium expand to a maximum size and then collapse with great violence as part of a cavitation phenomenon. When such cavitation phenomenon is properly controlled, high energy densities occur within the bubbles formed in the surrounding liquid medium. According to the Flynn patent, the surrounding liquid medium in the cavitation zone is liquidfied metal to which energy is applied, including acoustical waves.

The creation of bubbles within a liquid medium such as a mixture of glycerin and water to which energy is applied through a transducer to control periodic collapse and reformation of the bubbles, is known in the art as "sonoluminescence". Such "sonoluminescence" phenomenon involves the cyclic emission of energy in the visible spectrum from the collapsing bubbles. It is also generally known that bubbles exist long enough to allow development therein of a significant vapor pressure influencing the dynamics of bubble oscillations within sinusoidally varying acoustic fields, limiting the extent of bubble collapse.

It is therefore an important object of the present invention to provide a method of developing extremely high pressures within the small volume of a single bubble, cavitationally induced within a liquid medium by minimizing the delay in bubble formation and collapse during development of vapor within the bubble.

SUMMARY OF THE INVENTION

In accordance with the present invention, a chamber is filled with a liquid separated from a body of gas pressure generating control is achieved by the introduction of a manipulating acoustic pressure field after the liquid is pressurized to a static pressure less than or greater than ambient atmospheric pressure. In order to apply energy to an object at a precise location in the liquid, a compressional acoustic shock wave is introduced into the liquid so as to strike a free surface of the liquid for reflection as a dilatation wave focused on the location of such object such that a bubble forms and expands about the object until the static pressure causes collapse of the bubble.

The aforementioned compressional wave is generated in such a way that it has an extremely rapid rise time and is caused to reflect the focused shock wave forming the cavitation bubble during a single pressure cycle. The bubble so formed rapidly expands under liquid momentums and immediately collapses. Such rapid formation and collapse of a bubble during a single cycle pursuant to the present invention avoids both the development of instability surface waves on the bubble causing its breakup and the establishment of a significant amount of vapor pressure within the bubble due to vapor leakage from the liquid to correspondingly limit bubble compression ratio. A predetermined amount of energy is thereby deposited on the object at a precise location and time to obtain a precise concentration of such energy.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF THE INVENTION

Figure 1:
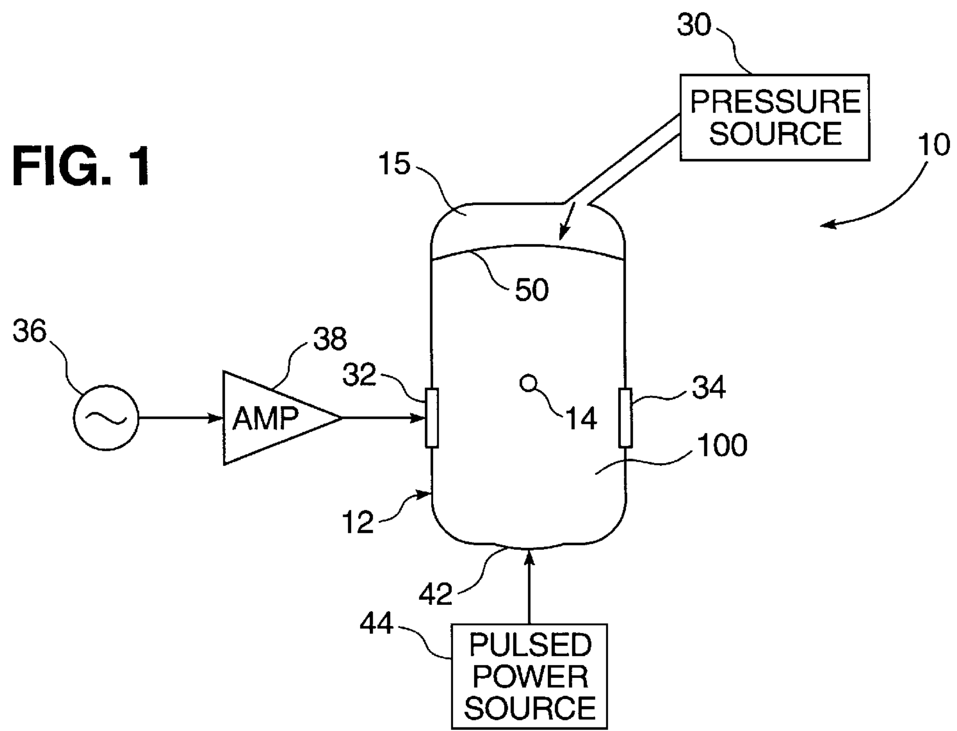
FIG. 1 is a schematic representation of an acoustically driven bubble pressure generating system according to the present invention.

Referring now to the drawing and more particularly to FIG. 1, a schematic representation is shown of an acoustically driven bubble pressure generating system 10 having a shock wave container chamber 12 within which a liquid 100 is processed under a static pressure P that is either less or greater than the ambient atmospheric pressure of the liquid 100. Such static pressure is developed in chamber 12 by its connection to a pressure source 30 which pressurizes a body of gas 15 as a medium having a low characteristic acoustic impedance.

According to one embodiment, an object 14 is positioned within chamber 12 by an acoustic pressure field imparted to the liquid 100 by means of acoustic transducers 32 and 34 shown mounted in sidewalls of chamber 12. It is to be understood that transducers 32 and 34 are representative of either a plurality of individual transducers or a continuous transducer wrapped around chamber 12. Transducers 32 and 34 are excited by a high frequency (e.g., 10 kHz–400 kHz) sinusoidal wave typically generated by a combination of a function generator 36 and power supply 38. For clarity of illustration, only transducer 32 is shown connected to function generator 36 and power supply 38.

Another transducer 42 is provided in a wall of chamber 12 to deliver a compressional acoustic shock wave into liquid 100. Similar to transducers 32 and 34, it is to be understood that transducer 42 may be a single transducer or a plurality of transducers. Transducer 42 is excited by a pulsing power source 44 and may be curved as shown so as to generate a compressional acoustic shock wave that is spherical in nature and focused on a point location. Alternatively, transducer 42 may be a flat transducer that generates a plane wave.

A free surface is formed on liquid 100 by an element 50 separating it from the body of gas 15 in chamber 12. Such element 50 is typically in the form of a flexible diaphragm or membrane made of an elastic material (e.g., rubber) or a thin metal plate. As will be further explained hereinafter, element 50 is arranged to produce the free surface of liquid 100 that is sized and shaped to reflect the compressional shock wave generated by transducer 42 as a dilatation wave focused on the location of object 14. Accordingly, the free surface of the liquid 100 is also preferably curved to reflect a spherical dilatation wave focused on the object 14. The free surface of the liquid 100 may be curved entirely across chamber 12 as shown, or curved over only a portion thereof. The dilatation wave is produced in such indirect fashion because direct application of large amplitude dilatation waves into a liquid is difficult. Accordingly, pursuant to the present invention the compressional wave is generated and is reflected off the free surface of the liquid 100 to form the dilatation wave focused on the location of object 14 about which a bubble is formed. The object 14 may be a biological cell, a pellet or some other surface to be cleansed.

The mechanism for generating a high bubble pressure will now be explained with the aid of FIGS. 2A–2D wherein diagrammatic representations of the free surface formed by element 50, the compressional shock wave, and the resulting dilatation wave are shown. It is assumed that compressional shock wave 300 has been generated in the form of a pulse by transducer 42 as hereinbefore explained.

Figure 2A:
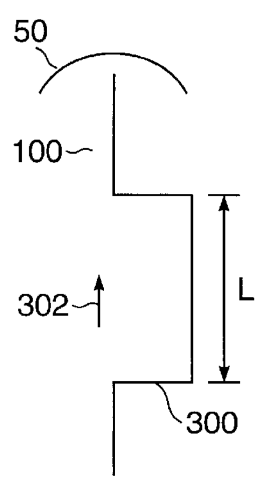
FIG. 2A is a diagrammatic representation of the compressional shock wave approaching the free surface.
Figure 2B:
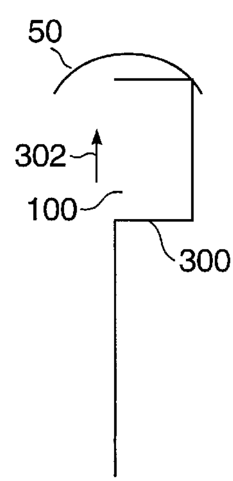
FIG. 2B is a diagrammatic representation of the compressional shock wave impinging on the free surface.
Figure 2C:
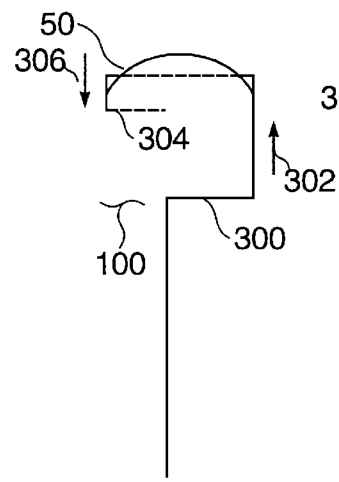
FIG. 2C is a diagrammatic representation of the compressional shock wave first reflecting off the free surface as a dilatation wave focused on a point in a desired cavitation zone.
Figure 2D:
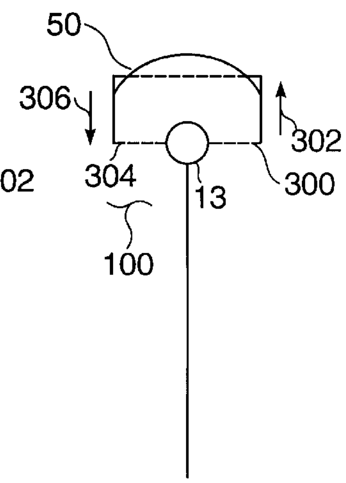
FIG. 2D is a diagrammatic representation of the point at which the compressional shock wave and dilatation wave are equal to one another causing the liquid to break up and form a bubble about a focus point.

In FIG. 2A, compressional shock wave 300 is shown approaching the free surface of liquid 100 formed by element 50 in the direction indicated by arrow 302. As will be further explained, the selection of length L for compressional wave 300 is related to the geometry of the free surface and the type of shock wave involved (e.g., spherical wave, plane wave, etc.). At this point, it is sufficient to appreciate that compressional wave 300 impinges upon the free surface as diagrammed in FIG. 2B. As shown in FIG. 2C, such free surface then reflects back compressional wave 300 as dilatation wave 304 traveling in the direction indicated by arrow 306. When the amount of compressional wave 300 equals the amount of dilatation wave 304 (i.e., when the length of each wave is L/2), liquid 100 breaks up to form a bubble 13 about the location of object as shown in FIG. 2D. Bubble 13 continues to expand spherically until the liquid static pressure P, overcomes the forces from dilatation wave 304 that formed the expanding bubble 13. When this occurs, bubble 13 begins to collapse about the location of object 14.

By expanding bubble 13 prior to its collapse, extremely high pressures on the order of several kilo electron volts (keV) may be developed within the bubble if the static pressure is sufficiently high such as $10^3$ atmospheres. It has been found experimentally that a bubble compression ratio of at least $10^{12}$ can be achieved, the bubble compression ratio being a comparison of the static pressure in the liquid within bubble 13 at collapse.) The amount of liquid static pressure is proportional to the amount of energy needed and is therefore selected to allow for bubble expansion. The introduction of such static pressure also allows more energy to be gained from a smaller bubble as the static pressure on the outside of bubble 13 causes collapsing fluid to gain momentum. Such introduction of the static pressure also insures that a single bubble forms when liquid 100 breaks up due to dilatation wave 304. Furthermore, the pressure produced by the compressional shock wave 300 is slightly greater than the internal static bubble pressure to thereby aid in the formation of a spherical bubble 13. Sphericity of bubble 13 is important since a spherical bubble upon collapse will deliver its energy focused at the location of object 14. Furthermore, a small bubble because of its rapid expansion and collapse does not allow enough time for unstable modes to develop. Thus, the establishment of the static pressure insures that a small bubble is formed (which also has the appropriate amount of energy) and bubble instability is avoided.

Figure 3A:
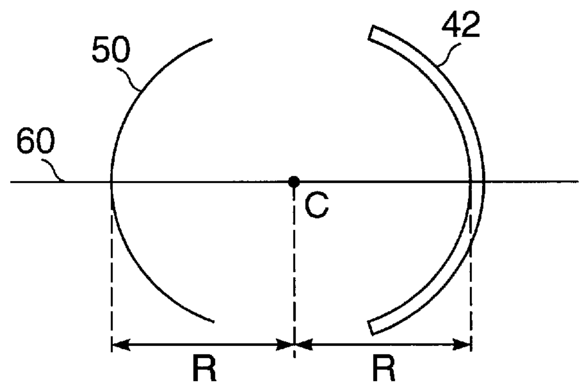
FIG. 3A is a diagrammatic representation depicting the focusing geometries utilized by the present invention for a spherical transducer and a spherical free surface.

As aforementioned, the curved shape of the free surface of liquid 100 formed by element 50 effects reflection and focus of dilatation wave 304. To accomplish this, the focusing aspect of the present invention is based on optical principles. According to one embodiment as shown diagrammatically in FIG. 3A, the free surface forming element 50 and transducer 42 are each spherical and have a radius of curvature R and the same center C. In such example, center C is the point of focus for the free surface (as well as being the point of focus for transducer 42). Center C lies along what is the equivalent of the optical axis 60 of the free surface. As so described, the compressional wave must equal the dilatation wave at the dilatation wave's point of focus in order to cause the liquid to break up and form a bubble. Accordingly, the compressional wave for this arrangement has a length L=2R.

Figure 3B:
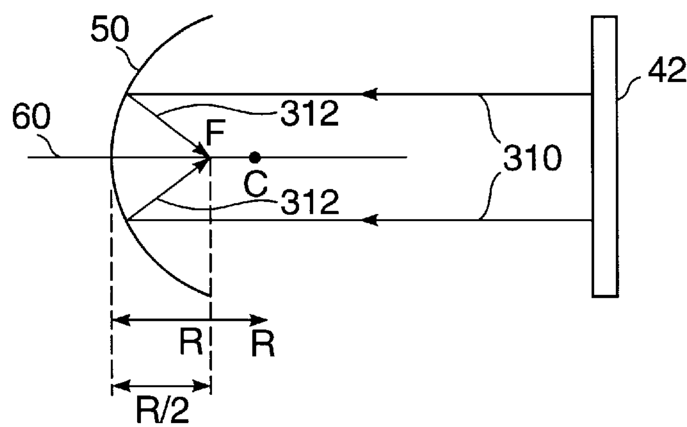
FIG. 3B is a diagrammatic representation depicting the focusing geometries utilized by the present invention for a flat transducer and a spherical free surface.

Another implementation of the present invention is shown diagrammatically in FIG. 3B, where transducer 42 is flat and the free surface is curved with a radius of curvature R and a center C. In this arrangement, transducer 42 transmits the compressional wave in the form of a plane wave front indicated by parallel lines 310. Plane wave front 310 is reflected as a dilatation wave, referenced by arrows 312, focused at a point F located a distance R/2 from the free surface along what is the equivalent of its optical axis 60. Thus, the compressional wave has a length L=R in this geometrical arrangement.

Figure 3C:
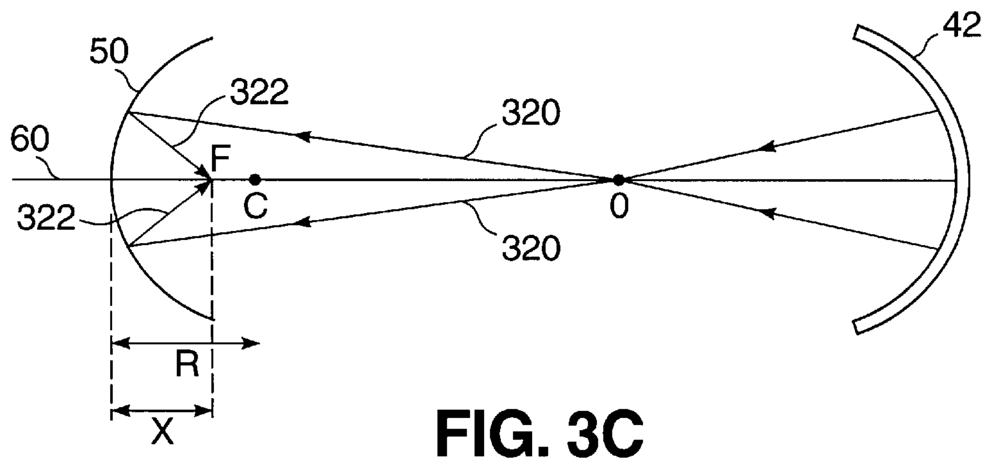
FIG. 3C is a diagrammatic representation depicting the focusing geometries utilized by the present invention for a compressional wave that apparently originates from a point and a spherical free surface.

Yet another implementation of the present invention is shown diagrammatically in FIG. 3C, where a compressional wave front indicated by lines 320 is spherical and focused by transducer 42 at a point 0. In terms of the free surface formed by element 50, wave front 320 appears as if it originates from point 0. Wave front 320 is reflected as a dilatation wave, referenced by arrows 322, focused at a point F located a distance x from the free surface along axis 60. In this geometrical arrangement, the compressional wave has a length L=2x.

In addition to the foregoing embodiments of the invention, variations in free surface and/or transducer geometries are possible including the use of a parabolically curved free surface. The aperture size of a parabolic free surface may be easily increased to correspondingly increase the size of the wave front thereby potentially providing for the generation of more energy upon bubble collapse. Liquid 100 is typically water or a water mixture having an increased viscosity to improve bubble stability. Such a water mixture may include glycerin as a component of the liquid.

The advantages of the present invention are numerous. A bubble pressure is developed by the use of static and acoustic pressure fields at a far lower cost and yet produce extremely high pressures at the bubble location in the order of several kilo electron volts.

Although the invention has been described relative to certain specific embodiments thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. In combination with a chamber filled with a liquid having a free surface and a system depositing a predetermined amount of energy for concentration on an object positioned within the chamber, comprising: means for pressurizing said liquid to a static pressure different from ambient atmospheric pressure; means for introducing an acoustic wave into said liquid; and means positioned in the chamber along said free surface of the liquid for reflection and focussing of the acoustic wave onto said object to form a bubble expanding around said object and collapsing in response to said static pressure.

2. A pressure generating system as in claim 1 wherein said liquid is a water mixture.

3. A pressure generating system as in claim 1 wherein said bubble is spherical.

4. A pressure generating system as in claim 1 wherein said means introducing said acoustic wave comprises:

at least one acoustic transducer mounted on the chamber exposed to said liquid; and means for exciting said at least one transducer to produce said acoustic wave.

5. A pressure generating system, comprising:

a chamber filled with a liquid under ambient atmospheric pressure;

means for maintaining a free surface within said liquid;

means for pressurizing said liquid to a static pressure different the ambient atmospheric pressure;

means for establishing a focus point at a predetermined location in the liquid; and means for introducing a compressional acoustic shock wave within a predetermined frequency range into said liquid for reflection of a dilatation acoustic shock wave from the free surface to form and expand a bubble at said predetermined location, said static pressure causing collapse of said bubble to establish a predetermined bubble compression ratio.

6. A pressure generating system as defined in claim 5 wherein said predetermined bubble compression ratio is at least $10^{12}$.

7. A pressure generating system as in claim 5 wherein said liquid is a water mixture.

8. A pressure generating system as in claim 7 wherein said water mixture includes glycerin.

9. A pressure generating system as in claim 5 wherein said bubble is spherical.

10. A pressure generating system as in claim 5 wherein said means for establishing the focus point includes means for introducing a manipulating acoustic field into said liquid.

11. A pressure generating system as in claim 10 wherein said means for introducing said manipulating acoustic field is a first acoustic transducer exposed to said liquid and said means for introducing said compressional acoustic shock wave is a second acoustic transducer exposed to said liquid in spaced relation to the first acoustic transducer.

12. A pressure generating system as in claim 5 wherein said free surface is curved.

13. A pressure generating system as in claim 5 wherein said means for introducing said compressional acoustic shock wave is an acoustical transducer.

14. A method of depositing energy, comprising the steps of: providing a chamber with a liquid under ambient atmospheric pressure; establishing a preferred location in said liquid; pressurizing said liquid through a free surface thereon within the chamber to a static pressure different from the ambient atmospheric pressure; and introducing an acoustic wave into said liquid for reflection from said free surface as a dilatation acoustic shock wave focussed on said preferred location to form a bubble thereat in which the energy is concentrated upon collapse of the bubble under said static pressure.

15. A method according to claim 14 wherein said step of establishing the preferred location locates an object within said liquid about which the bubble is formed.

16. A method according to claim 14 wherein said chamber encloses a body of gas interfaced with said liquid along the free surface through which the liquid is pressurized and reflecting the acoustic shock wave into said dilatation acoustic shock wave focussed on said preferred location.

17. A method according to claim 14 wherein said collapse of the bubble establishes a bubble compression ratio of at least $10^{12}$.

18. A method of generating pressure, comprising the steps of: providing a chamber with a liquid having a free surface; locating a point of focus at a predetermined location in said liquid within the chamber at which an object is positioned; pressurizing said liquid to a static pressure; and introducing an acoustic wave having a predetermined duration into said liquid for reflection from the free surface toward said point of focus to form about said object a bubble collapsing from an expanded state in response to said static pressure to establish a predetermined bubble compression ratio.

19. In a method of generating high pressure within a small volume by cavitation of a liquid, including the steps of placing said liquid in a chamber under ambient atmospheric pressure and introducing pulsating acoustical energy to induce a cavitation effect within a predetermined zone in the liquid causing formation of a bubble therein, the improvement residing in the steps of: pressurizing the liquid within the chamber to a static pressure different from said ambient atmospheric pressure; and reflecting from a free surface said acoustical energy within the chamber as a shock wave focused on a point within said predetermined zone in the chamber at which the bubble is formed and collapsed by the static pressure.

20. The method as defined in claim 19, including the step of: separating said liquid from a body of gas within the chamber through which the liquid is pressurized along a free surface from which the acoustical energy is reflected as the focused shock wave.

* * * * *